US005970785A

United States Patent [19]

Giorgetta et al.

[11] Patent Number: 5,970,785

[45] Date of Patent: Oct. 26, 1999

[54] HEATER CONTROL CIRCUIT

[75] Inventors: Valerio Giorgetta, Turin; Paolo Mastella, Camino; Giampietro Maggioni, Cornaredo; Mirco Contucci, Sant' Arcangelo Di Romagna, all of Italy

[73] Assignee: SGS-Thomson Microelectronics S.r.l., Agrate Brianza, Italy

[21] Appl. No.: 08/853,163

[22] Filed: May 8, 1997

[30] Foreign Application Priority Data

May 8, 1996 [IT] Italy ................................ T096A0378

[51] Int. Cl.[6] .......................... F02D 41/14; G01M 15/00

[52] U.S. Cl. ............................................................ 73/118.1

[58] Field of Search ............................... 73/23.31, 23.32, 73/116, 117.2, 117.3, 118.1

[56] References Cited

U.S. PATENT DOCUMENTS

| | | | |
|---|---|---|---|
| 4,520,653 | 6/1985 | Kaiser | 73/23 |
| 4,655,182 | 4/1987 | Nakano et al. | 123/440 |
| 4,993,392 | 2/1991 | Tanaka et al. | 123/489 |
| 5,055,269 | 10/1991 | Palumbo et al. | 73/23.31 |
| 5,327,780 | 7/1994 | Entenmann et al. | 73/118.1 |
| 5,360,266 | 11/1994 | Lenfers et al. | 73/23.31 |
| 5,392,643 | 2/1995 | O'Kennedy et al. | 71/118.1 |
| 5,454,259 | 10/1995 | Ishii et al. | 73/118.1 |
| 5,524,472 | 6/1996 | Hötzel | 73/23.32 |

FOREIGN PATENT DOCUMENTS

| | | |
|---|---|---|
| 0 482 366 | 4/1992 | European Pat. Off. . |
| 3 517 252 | 11/1985 | Germany . |
| 3 842 287 | 8/1989 | Germany . |

*Primary Examiner*—George Dombroske
*Attorney, Agent, or Firm*—Jenkens & Gilchrist P.C.

[57] ABSTRACT

A circuit comprises a measurement resistor in series with a heater, a detector circuit for providing a signal indicative of the current flowing in the resistor, switching devices for controlling the connection of the heater to a voltage source and the connection of the measurement resistor in the supply circuit comprising the source and the heater, and a control unit arranged to drive the switching devices in a manner such that each time the heater is activated, the measurement resistor is kept disconnected from the supply circuit of the heater for a predetermined period of time and the measurement resistor is then connected in the supply circuit of the heater.

13 Claims, 6 Drawing Sheets

HEATER CONTROL CIRCUIT

BACKGROUND OF THE INVENTION

1. Technical Field

The present invention relates to control circuits and, more particularly, to control circuits for heaters with variable resistance associated with sensors for detecting oxygen in exhaust gases.

2. Prior Art

The present O.B.D. II standards for emissions (exhaust gases) require the operating temperature of the lambda probe to be kept within a well-defined range. This requirement cannot be satisfied simply by the selection of the resistance of the heater and/or by automatic compensation thereof.

The functionality of the heater can be monitored by accurate detection of the current passing through the measurement resistor associated with the heater and the functionality of the probe can thus be deduced for a subsequent adjustment operation, if necessary.

In view of the tight tolerances imposed by the O.B.D. II standard, the current measurement has to be particularly accurate but this conflicts with two contrasting requirements relating to the resistance of the measurement resistor.

In fact, because of the high initial current, this resistor has to have a very low resistance. In the steady state, however, when the current is lower, the voltage drop in a measurement resistor with low resistance would be a few mV giving rise to large measurement errors, which also arise because of the offset and drift which are not negligible in comparison with the useful signal.

The use of a measurement resistor with a high resistance, on the other hand, would involve a loss of efficiency of the heater at the stage immediately following activation (a longer time required to reach the steady state) and, in particular, would involve a large power dissipation by the measurement resistor during the initial stage, with obvious problems of size.

SUMMARY OF THE INVENTION

An object of the present invention is to provide an improved control circuit for a heater with variable resistance associated with an oxygen sensor, which overcomes the problems outlined above and which, in particular, is suitable for enabling the sensor to operate at the most uniform possible temperature, to ensure precise and reliable measurements.

This and other objects are achieved, according to the invention, by a control circuit including:

- a measurement resistor which can be connected substantially in series with the heater, and
- detector means connected to the measurement resistor for providing a signal indicative of the current flowing in the resistor, and hence in the heater.

Oxygen sensors or lambda probes are normally used in motor-vehicle catalytic converters for measuring the quantity of oxygen present in the exhaust gases.

Lambda probes operate correctly only if their temperature is high enough. At normal running speeds this is ensured by the high temperature of the exhaust gases.

Upon starting, the activation of a heater associated with the sensor generates an additional quantity of heat such as to heat the sensor quickly and limit emissions.

The electrical resistance of the heater is of the type which is variable positively with temperature (the PTC type). Its value increases progressively from a minimum upon activation to a much higher steady value when the temperature of the gases has stabilized.

The current absorbed by the heater at the starting stage may consequently even be one order of magnitude higher than that absorbed in the steady state. Naturally this current also depends upon the supply voltage (the battery voltage).

According to the invention, the measurement resistor can be of an optimal size since the current flowing in the heater passes through this resistor only after it has substantially reached the steady value.

BRIEF DESCRIPTION OF DRAWINGS

Further characteristics and advantages of the control circuit according to the invention will become clear from the following detailed description, given purely by way of non-limiting example, with reference to the appended drawings, in which.

DETAILED DESCRIPTION OF A PREFERRED EMBODIMENT OF THE INVENTION

Figure 1:
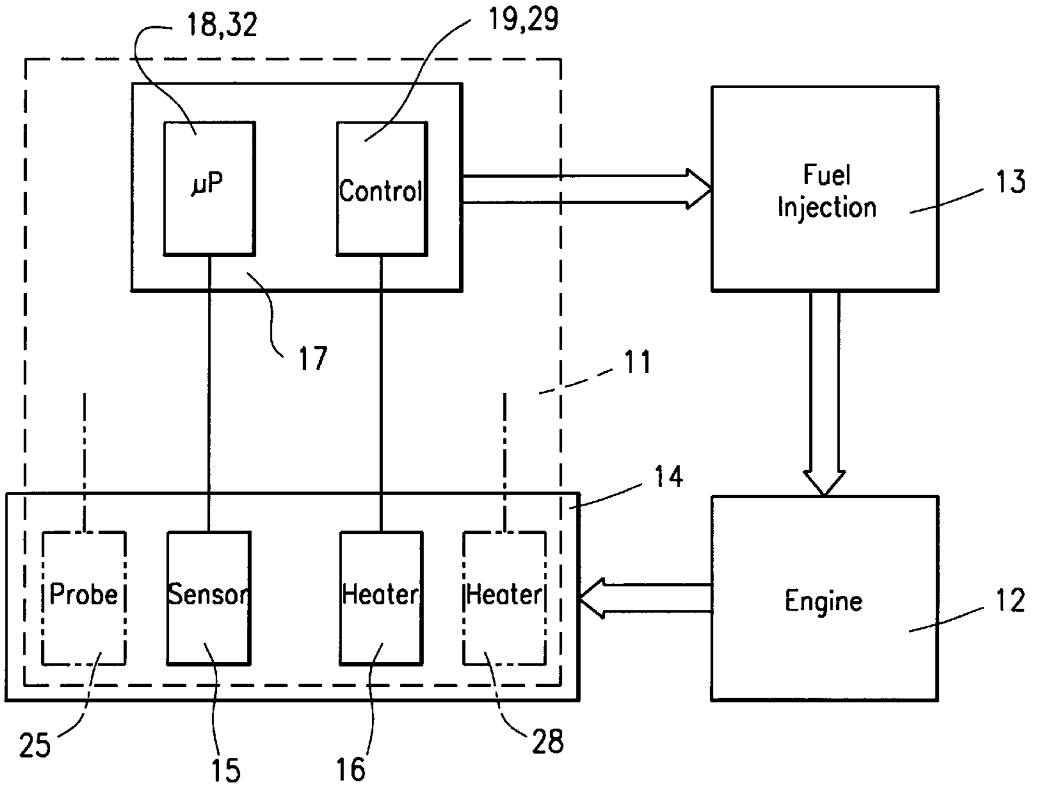
FIG. 1 is a block diagram showing a system for controlling emissions with a lambda probe having a resistive heater, associated with a motor-vehicle internal combustion engine.

FIG. 1 shows, in the form of a block diagram, a system 11 for controlling the emissions of a motor-vehicle internal combustion engine 12.

The system 11 operates in association with a fuel injection system 13 and a catalytic converter 14. It comprises a sensor 15 for detecting oxygen in the exhaust gases (a lambda probe) associated with an electric heater 16 and an electronic control unit 17 including a microprocessor 18.

The lambda probe 15 can provide signals indicative of the quantity of oxygen present in the exhaust gases.

The electronic unit 17 uses these signals to regulate the injection system 13 so as to achieve an optimal air-fuel ratio.

The probe 15 is mounted in the converter 14 together with the electric heater 16. This heater comprises a resistor Rr1 (see FIG. 3) having a first terminal connected to one pole of a direct-current voltage source, for example, the positive pole of the motor-vehicle battery.

The electronic unit 17 comprises a control circuit 19 associated with the heater 16 and connected to the other terminal of the heater resistor Rr1 in order to control the connection of this resistor to earth. The resistance of the resistor Rr1 is variable positively with temperature.

Figure 2:
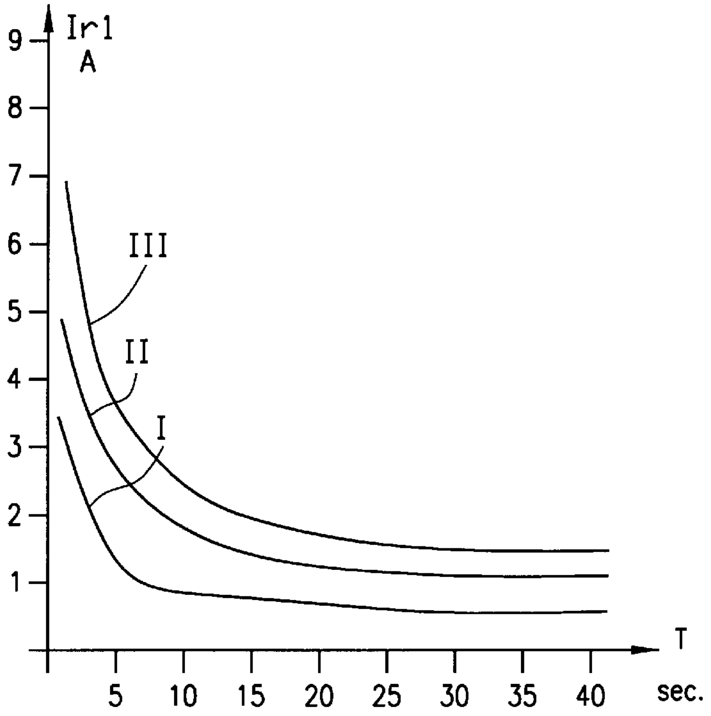
FIG. 2 shows examples of curves of current as a function of time, for a given battery voltage, for various heaters which can be associated with a lambda probe.

FIG. 2 shows three curves I, II and III, representing the current Ir1 in the resistor Rr1 as functions of time T for three possible values of the resistance of this resistor which correspond to different dissipation levels, for example, of 5 W, 12 W and 18 W, respectively.

It can be seen that, irrespective of the type or resistance of the heater, the current Ir1 varies progressively from a maximum upon activation of the heater to a steady minimum value which is lower than the maximum value by almost one order of magnitude.

Figure 3:
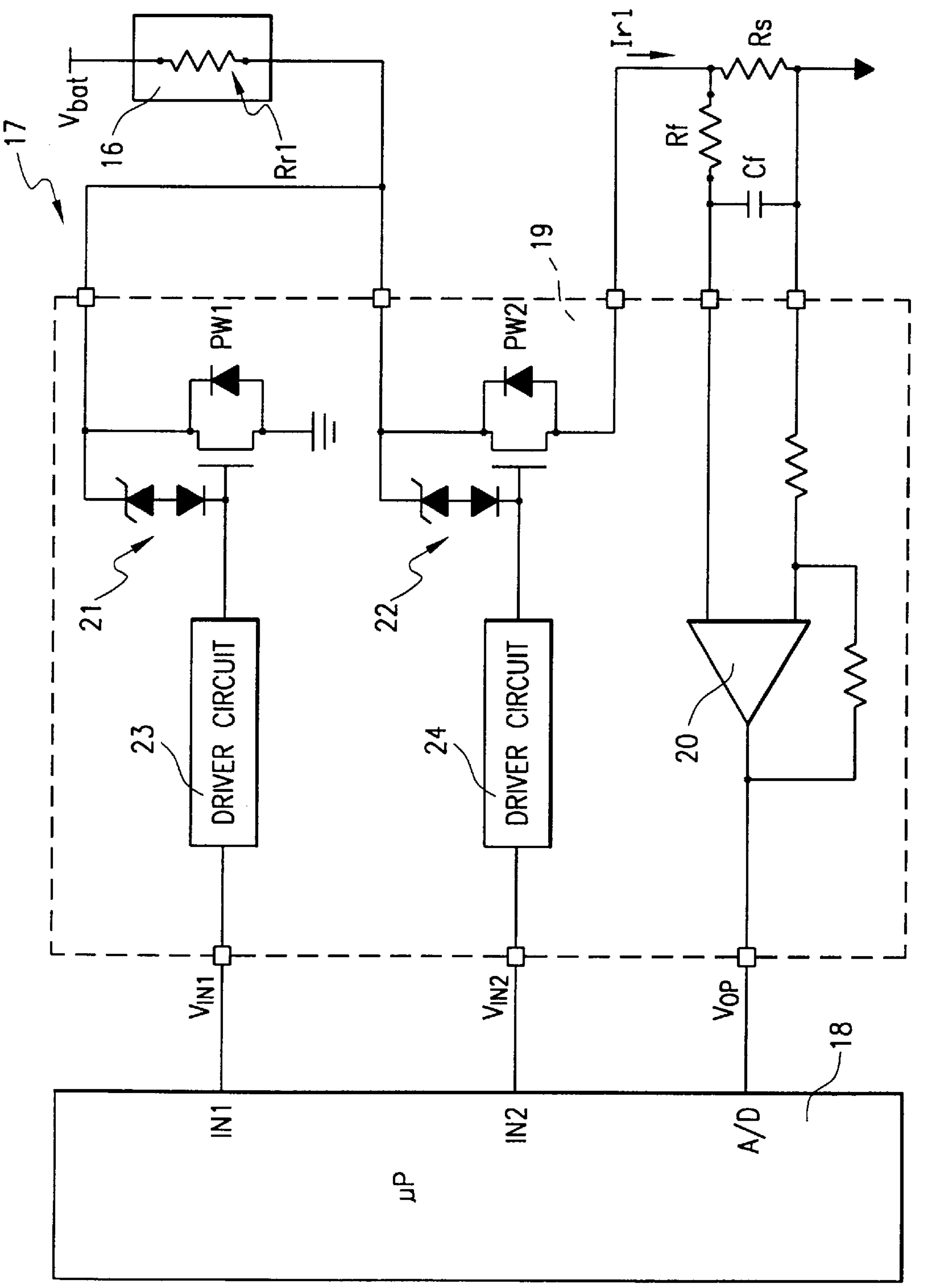
FIG. 3 is a circuit diagram of an embodiment of a control circuit according to the invention.

With reference to FIG. 3, a control circuit 19 according to the invention has the purpose of monitoring the current Ir1 in the resistor Rr1 of the heater 16. This circuit, which is connected to a terminal of a measurement (shunt) resistor Rs of which the other terminal is earthed, comprises an amplifier 20 connected to the measurement resistor Rs and switching devices 21, 22 driven by the microprocessor 18.

The amplifier 20 is an operational amplifier and its inputs are connected to the measurement resistor Rs by means of a low-pass filter including a resistor Rf and a capacitor Cf. The output of the amplifier 20 provides a signal indicative of the current Ir1 at an analog/digital conversion input A/D of the microprocessor 18.

The switching devices 21, 22 comprise, for example, two transistors PWI and PW2 associated with respective driver circuits 23, 24. The transistors PW1 and PW2 are preferably of the PowerMOS type and their drains are connected to the resistor Rr1 of the heater 16.

The source of PWI is connected directly to earth whereas the source of PW2 is connected to earth through the measurement resistor Rs.

The respective inputs of the driver circuits 23 and 24 are connected to corresponding output terminals INI and IN2 of the microprocessor 18. A Zener diode may advantageously be interposed between the drain and the gate of each transistor PWI and PW2 for protection against overvoltages which may be generated owing to inductive effects in the heater supply lines.

The switching devices 21 and 22, suitably driven by the microprocessor 18, can define two different routes for the connection of the resistor Rr1 to earth. In particular, if PWI is conductive and PW2 is cut off, the resistor Rr1 is connected to earth through PW1, whereas when PW1 is cut off and PW2 is conductive, the resistor Rr1 is connected to earth through PW2 and the measurement resistor Rs. In this second condition, the resistor Rs detects the current Ir1 flowing in the heating resistor Rr1.

According to the invention, the strategy for the control of the heater 16 provides for the microprocessor 18 to make the transistor PWI conductive temporarily upon activation. The microprocessor 18 has associated storage in which a predetermined time period long enough for the heater 16, and hence the lambda probe 15, to reach the steady state, is defined.

After activation and when the time period stored has elapsed, the microprocessor 18 switches the switches 21 and 22, cutting off PWI and making PW2 conductive. In this situation, the current Ir1 flowing in the heater 16 passes through the transistor PW2 and the measurement resistor Rs and the microprocessor 18 can acquire, at its input A/D, a signal indicative of the level of the current Ir1.

Figure 4:
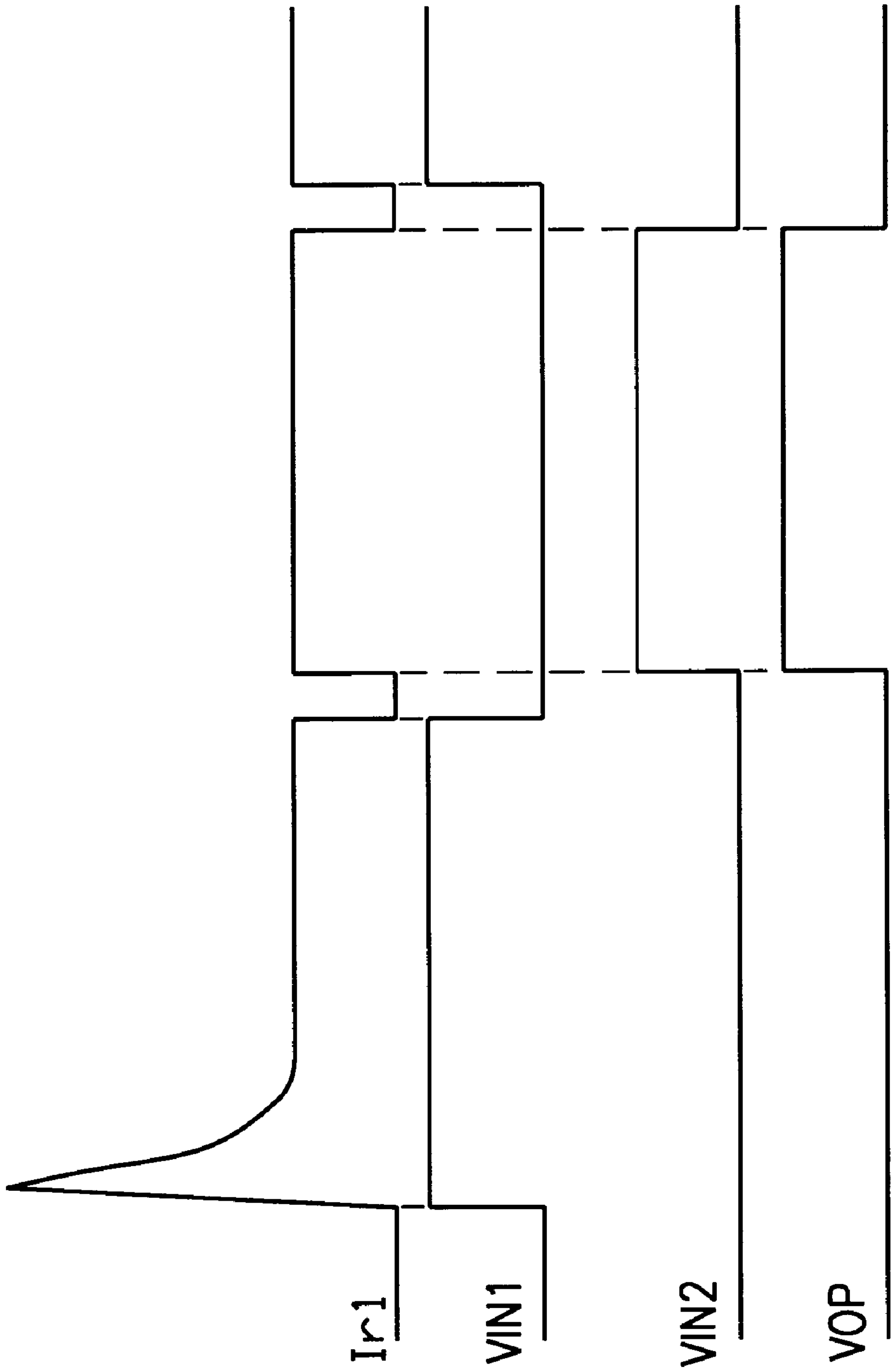
FIG. 4 is a series of four graphs showing examples of curves of some signals in the circuit of FIG. 3, in a first method of operation of the circuit.

FIG. 4 shows examples of curves of the signals VINI, VIN2 for driving the transistors PW1 and PW2, of the current Ir1, and of the output voltage VOP of the operational amplifier 20. The transistor PW1 is of a size such as to withstand the maximum transient intensity of Ir1 which may occur with variations of the type of heater, as well as with variations of the supply voltage Vbat and of the initial temperature.

The transistor PW2, on the other hand, can be of a size such as to withstand the maximum intensity of the current Ir1 when the heater 16 has reached a steady temperature.

The measurement resistor Rs is in turn of a size such that the operational amplifier 20 is in its optimal operating conditions in the steady state.

The timing of the switchings described above provides for the transistor PW1 to be cut off before the transistor PW2 becomes conductive. In this case, the current Ir1 in the heater 16 is cut off temporarily before and after the acquisition of the current value Ir1. This has no appreciable effect on the temperature of the lambda probe, however. In fact, the heater has a high thermal inertia in comparison with the very short switching times of the transistors PW1 and PW2.

Figure 5:
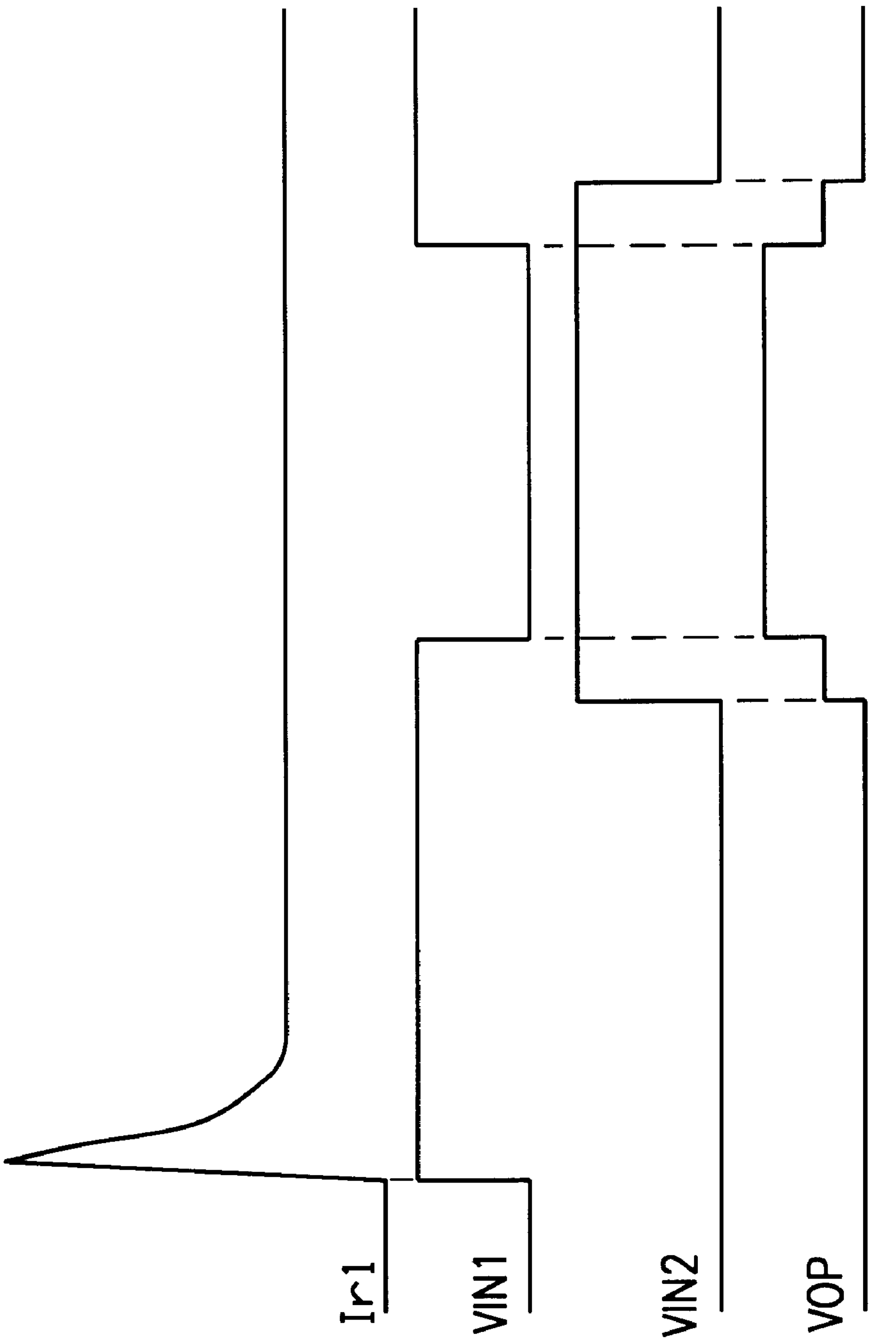
FIG. 5 is another series of four graphs showing the signals generated in the circuit of FIG. 3 in a second method of operation of the circuit.

The interruption of the current in the heater in the switching stages can, however, be avoided, by making PW2 conductive before PW1 is cut off and then making PW1 conductive before PW2 is cut off. The examples of curves of the signals shown in FIG. 5 correspond to this method of operation.

In this case, if a circuit (not shown) for detecting a short-circuit to earth is associated with the transistors PW1 and PW2, there may be an anomalous indication in the periods when they are conducting current simultaneously. The respective drains of the two transistors are in fact short-circuited and, therefore, when PW1 is conductive, PW2 is short-circuited to earth and, conversely, when PW2 is conductive, the transistor PW1 is short-circuited to earth. This anomaly indication may be neutralized.

Figure 6:
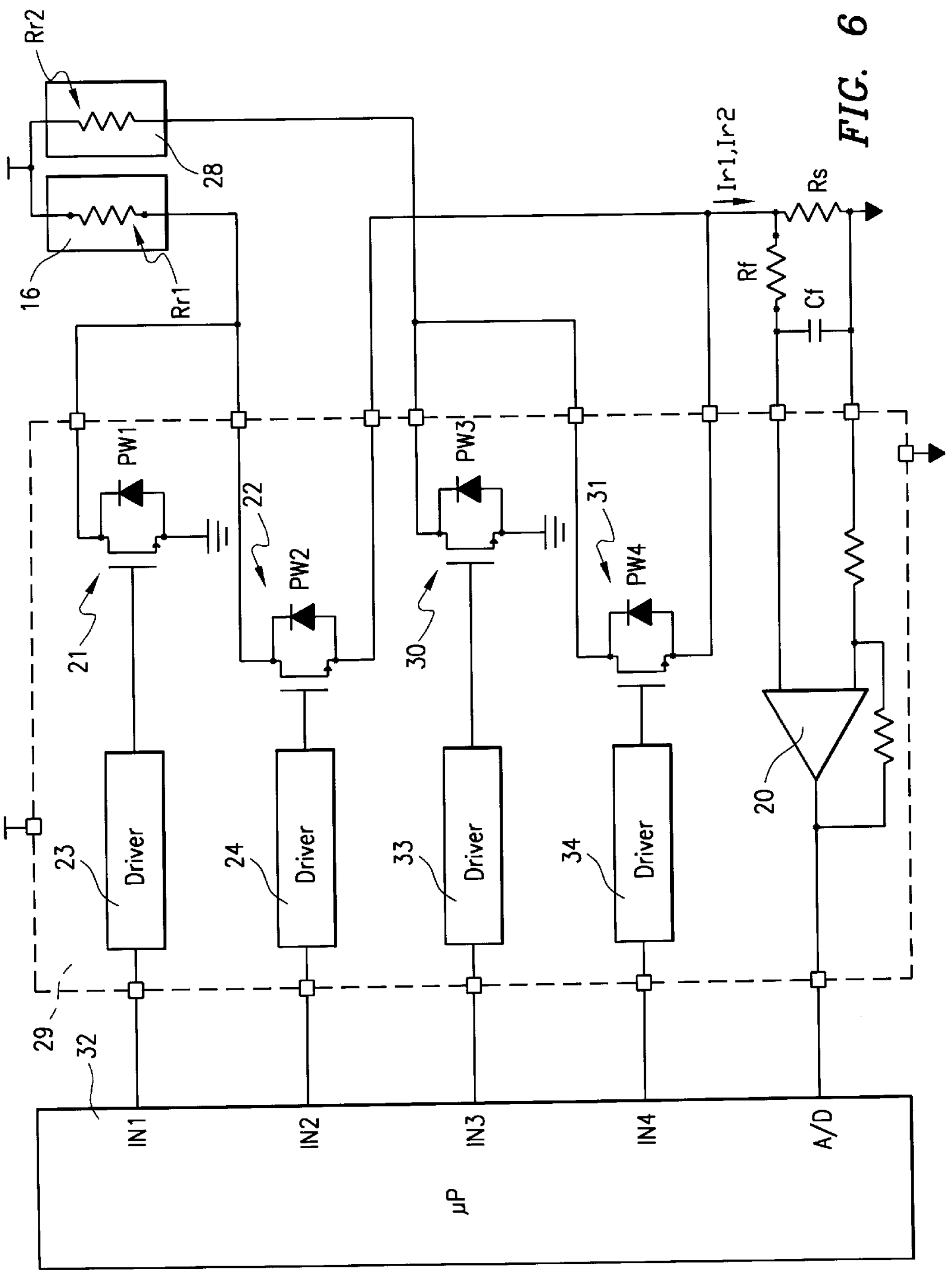
FIG. 6 shows the circuit diagram of a variant of the control circuit according to the invention.

The variant of FIG. 6 relates to a situation in which provision is made for the use of a further lambda probe, indicated 25 in FIG. 1, for controlling emissions.

In FIGS. 1 and 6, parts and elements already described above have again been attributed the same reference numerals.

In addition to the heater 16 associated with the first lambda probe 15, a second heater 28 is now provided, associated with the second lambda probe 25 and including a resistor Rr2, the resistance of which is also of the PTC type. The resistor Rr2 has a terminal connected to the battery.

The control circuit of the two lambda probes, which is indicated 29 in FIGS. 1 and 6, comprises a first portion identical to the circuit 19 described above for controlling the heater 16 and the switches 21, 22 and an additional portion for monitoring the current Ir2 in the heater 28 associated with the second lambda probe.

The circuit 29 is connected to a microprocessor 32 similar to the microprocessor 18 which, in addition to the input A/D and the output terminals IN1 and IN2, has two further output terminals IN3 and IN4 for two further switches 30, 31 associated with the heater 28 (Rr2). The currents Ir1 and Ir2 are monitored alternately with time sharing by the microprocessor 32 and the two heaters 16 and 28 are controlled alternately.

In practice, the driving structure is thus duplicated in comparison with that of the circuit 19 of FIG. 3, whereas there is advantageously only one circuit portion for detecting the currents.

The microprocessor 32 can in fact arrange for the current Ir1 or Ir2 of one of the two heaters to flow through the measurement resistor Rs at a time, when its intensity is to be acquired.

In particular, like the switches 21 and 22, the switches 30, 31 may comprise transistors PW3 and PW4 and respective driver circuits 33, 34. The transistors PW3 and PW4 are also advantageously of the PowerMOS type and have their drains connected to the resistor Rr2 of the heater 28.

The source of PW3 is connected directly to earth, whereas the source of PW4 is connected to earth through the shunt resistor Rs.

The drivers 33 and 34 are in turn interposed between the gates of PW3 and PW4 and the output terminals IN3 and IN4 of the microprocessor 32. The microprocessor 32 is arranged in a manner such that, for each activation of the heaters, PW1 and PW3 are made conductive in succession and PW2 and PW4 are kept cut off. Then, without any change in the conditions of the transistors PW3 and PW4, PW1 is cut off and PW2 is made conductive, after sufficient time for the heater 16, and hence the lambda probe 15, to reach a steady temperature. The current Ir1 flowing in the heater 16 now passes through the transistor PW2 and the measurement resistor Rs.

The microprocessor 32 then acquires the level of the current Ir1 and then returns the transistors PW1 and PW2 to the initial conditions to allow the current Ir1 to flow directly to earth.

At a later time, at least such as to allow the heater 28 and the lambda probe 25 to reach a steady temperature, and without interruption of conduction in the transistors PW1 and PW2, PW3 is cut off whilst PW4 is made conductive. The current Ir2 which flows in the heater 28 now passes through the transistor PW4 and the measurement resistor Rs and the microprocessor 32 acquires the intensity of the current Ir2. The transistors PW3 and PW4 are then returned to the initial conditions, enabling the current Ir2 to flow directly to earth.

The microprocessor 32 can be programmed suitably to acquire the values of the currents Ir1 and Ir2 periodically, repeating the sequence described above.

In the circuit variant of FIG. 6, the currents Ir1 and Ir2 flowing in the heaters 18 and 26 are also interrupted temporarily before and after reading without a significant effect on the temperature.

The circuit 29 which performs the function of controlling and monitoring the currents Ir1 and Ir2 of the two heaters 16 and 28 may be formed in a single custom-made integrated circuit.

Figure 7:
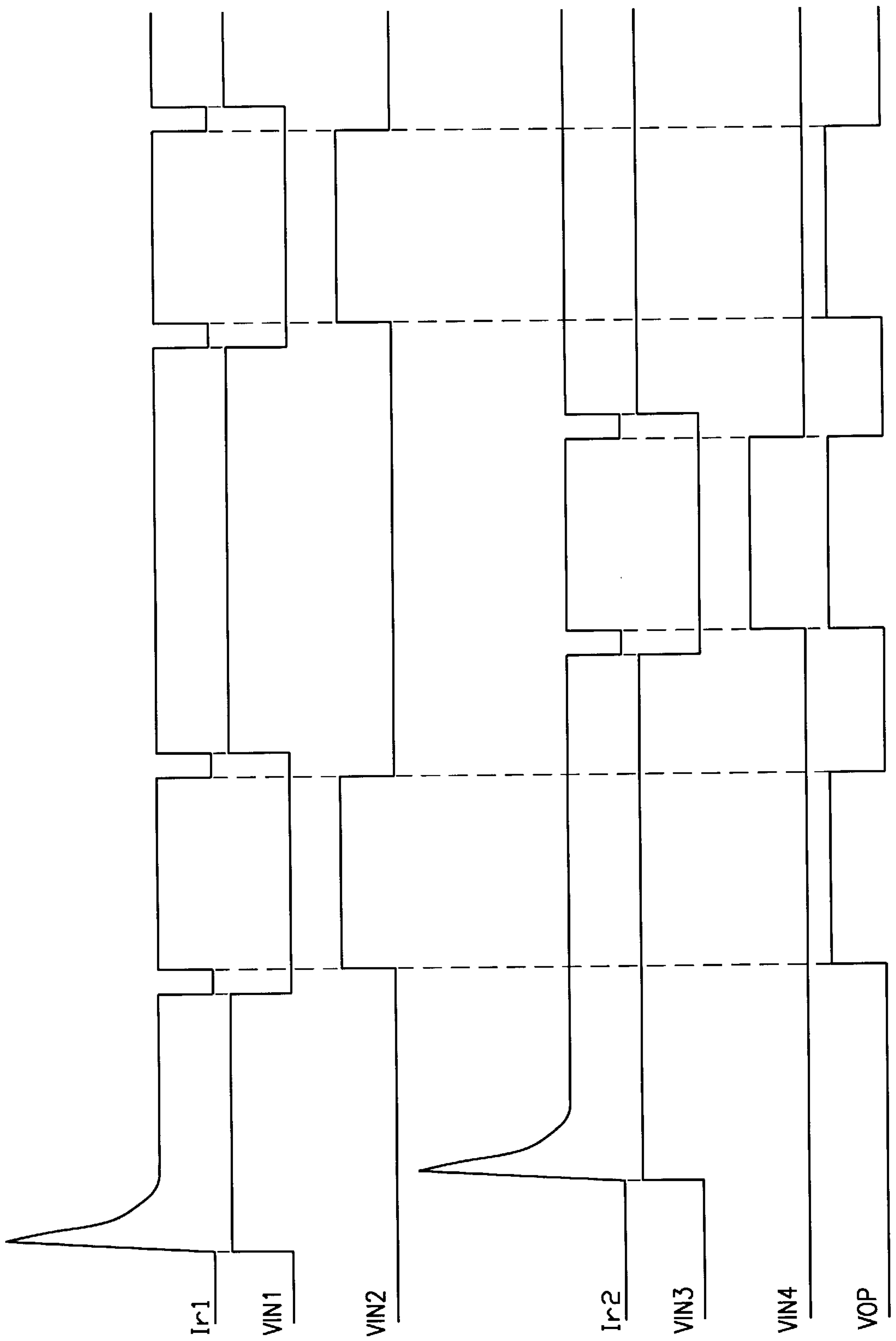
FIG. 7 is a series of graphs showing examples of curves of some signals in the circuit of FIG. 6.

FIG. 7 shows examples of the curves of the driver signals VIN1, VIN2, VIN3 and VIN4, of the currents Ir1 and Ir2, and of the output voltage VOP of the operational amplifier 20 for the circuit of FIG. 6.

The transistor PW3 is of a size such as to withstand the maximum intensity of Ir2 which may occur with variations of the supply voltage and of the initial temperature. The transistor PW4, on the other hand, is of a size such as to withstand the maximum intensity of the current Ir2 when the heater 28 is in the steady state.

The measurement resistor Rs is in turn of a size such that, in the steady state, the operational amplifier 20 is in optimal operating conditions both for the heater 16 and for the heater 28.

The microprocessor 18 or 32 can detect any deterioration of the heater 16 or 28 upon the basis of the values acquired for the current Ir1 and/or Ir2. It can also implement a strategy for de-activating the heater 16 or 28 in optimal running conditions, increasing the life and reliability thereof.

Naturally, the principle of the invention remaining the same, the forms of embodiment and details of construction may be varied widely with respect to those described and illustrated purely by way of non-limiting example, without thereby departing from the scope of the present invention as defined in the appended claims.

What is claimed is:

1. A control circuit for a load device having a variable resistance, comprising:

a measurement resistor;

detector means connected to the measurement resistor for providing a signal indicative of the current flowing in the measurement resistor;

switching means for controlling connection of the load device to a voltage source and the connection of the measurement resistor in a supply circuit comprising the voltage source and the load device, wherein said measurement resistor and said load device are connected in series; and control means arranged to drive the switching means in a manner such that each time the load device is activated, the measurement resistor is disconnected from the supply circuit for a predetermined period of time k, after which the measurement resistor is connected in the supply circuit.

2. A control circuit, according to claim 1, wherein said control circuit is adapted to control a plurality of load devices, each having variable resistance, the control circuit comprising a single measurement resistor, with a switching means being connected to the plurality of load devices and to the measurement resistor to enable the measurement resistor to be selectively connected in series with each of the load devices in a predetermined sequence.

3. A control circuit, according to claim 2, wherein one terminal of the or each load device is connected to a pole of the voltage source and the other terminal is connected to the other pole of the source by a first or a second path, the first path comprising an electronic switch, and the second path comprising a second electronic switch and the measurement resistor.

4. A control circuit, according to claim 3, wherein the control means are arranged, upon each activation of the one or more of the load devices, to bring about the initial connection of the or each load device to the second pole of the voltage source by the associated first path and, after the predetermined initial period of time, to bring about the connection of the or each load device to the second pole of the voltage source by the associated second path.

5. A control circuit, according to claim 4, wherein the control means are arranged to drive the switches in a manner such that the connection of the or each load device to the second pole of the voltage source by the associated first path is disabled before the connection via the associated second path is enabled.

6. A control circuit, according to claim 4, wherein the control means are arranged to drive the switches in a manner such that the connection of the or each load device to the second pole of the voltage source by the associated first path is disabled after the connection by the associated second path has been enabled.

7. A control circuit, according to claim 2, wherein the first and second switches associated with the or each load device are Power MOS transistors.

8. A control circuit, according to claim 1, wherein the detector means comprise a differential amplifier connected to the measurement resistor.

9. A control circuit, according to claim 8, wherein the amplifier is connected to the measurement resistor by means of a low-pass filter.

10. A control circuit, according to claim 1, wherein the control means comprise a microprocessor.

11. A control circuit, according to claim 1, wherein said load device is a heater having a variable resistance.

12. A control circuit, according to claim 1, wherein said load device includes a gas sensor.

13. A control circuit, according to claim 1, wherein said control circuit controls one or more load devices associated with an internal combustion engine.

* * * * *

UNITED STATES PATENT AND TRADEMARK OFFICE

CERTIFICATE OF CORRECTION

PATENT NO. : 5,970,785

DATED : October 26, 1999

INVENTOR(S) : Giorgetta, et al.

It is certified that error appears in the above-identified patent and that said Letters Patent is hereby corrected as shown below:

Field 73, Assignee, should read:

Assignee: SGS-THOMSON MICROELECTRONICS, S.r.l
VIA C. OLIVETTI, 2
I20041 AGRATE BRIANZA, ITALY Assignee: MAGNETI MARELLI S.p.A.
VIA GRIZIOTTI 4
I20145 MILANO, ITALY Signed and Sealed this Fifteenth Day of May, 2001

Attest:

Nicholas P. Godici

NICHOLAS P. GODICI

Attesting Officer

Acting Director of the United States Patent and Trademark Office